United States Patent
Shindo et al.

(10) Patent No.: US 11,185,742 B2
(45) Date of Patent: Nov. 30, 2021

(54) GOLF BALL

(71) Applicant: SUMITOMO RUBBER INDUSTRIES, LTD., Kobe (JP)

(72) Inventors: Ayaka Shindo, Kobe (JP); Takumi Kaneko, Kobe (JP); Hiroshi Tadaoka, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 111 days.

(21) Appl. No.: 16/667,400

(22) Filed: Oct. 29, 2019

(65) Prior Publication Data
US 2020/0129813 A1 Apr. 30, 2020

(30) Foreign Application Priority Data

Oct. 30, 2018 (JP) .............................. JP2018-203923
Oct. 23, 2019 (JP) .............................. JP2019-192438

(51) Int. Cl.
| | |
|---|---|
| *C08K 5/372* | (2006.01) |
| *C08K 5/375* | (2006.01) |
| *A63B 37/02* | (2006.01) |
| *A63B 37/00* | (2006.01) |
| *C08K 3/22* | (2006.01) |

(52) U.S. Cl.
CPC ...... *A63B 37/0051* (2013.01); *A63B 37/0073* (2013.01); *A63B 37/0074* (2013.01); *A63B 37/0094* (2013.01); *C08K 3/22* (2013.01); *C08K 5/372* (2013.01); *C08K 5/375* (2013.01); *A63B 37/0061* (2013.01); *A63B 37/0065* (2013.01); *C08K 2003/2296* (2013.01)

(58) Field of Classification Search
None
See application file for complete search history.

(56) References Cited

U.S. PATENT DOCUMENTS

| | | | |
|---|---|---|---|
| 2005/0043401 A1* | 2/2005 | Kleemann | C07C 381/00 514/522 |
| 2011/0105244 A1 | 5/2011 | Fushihara et al. | |
| 2012/0135823 A1 | 5/2012 | Hibi et al. | |

FOREIGN PATENT DOCUMENTS

| | | |
|---|---|---|
| JP | 2011-92565 A | 5/2011 |
| JP | 2012-115407 A | 6/2012 |

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having excellent resilience performance. The present invention provides a golf ball comprising a constituent member, wherein at least a part of the constituent member is formed from a rubber composition containing (a) a base rubber, (b) a co-crosslinking agent, (c) a crosslinking initiator, and (d) an organic sulfur compound, wherein (d) the organic sulfur compound contains at least one member selected from the group consisting of a thiophenol having a halogenated sulfanyl group, a metal salt of a thiophenol having a halogenated sulfanyl group, and a diphenyl disulfide having a halogenated sulfanyl group.

15 Claims, 1 Drawing Sheet

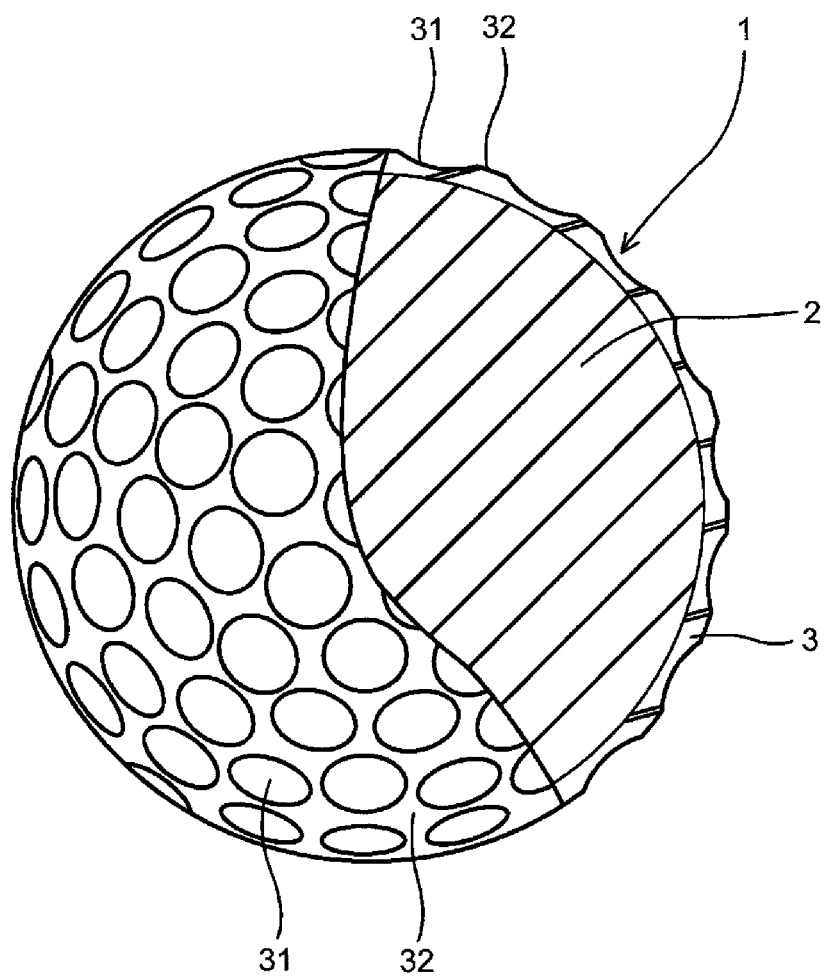

GOLF BALL

FIELD OF THE INVENTION

The present invention relates to a golf ball, and particularly relates to a technology for improving the resilience performance.

DESCRIPTION OF THE RELATED ART

Conventionally, as a rubber material used for a core of a golf ball, a product obtained by blending a co-crosslinking agent such as zinc acrylate and further adding a crosslinking initiator in a high-cis polybutadiene which is used as a base rubber, and radically polymerizing the base rubber and the co-crosslinking agent, is used to improve the resilience of the obtained core. It is known that if a very small amount of an organic sulfur compound or the like is added in the above described rubber composition containing the base rubber, the co-crosslinking agent and the crosslinking initiator, the core obtained from the rubber composition has further improved resilience (for example, refer to Tables 1 to 4 in JP 2011-092565 A, and Table 2 in JP 2012-115407 A).

SUMMARY OF THE INVENTION

As the organic sulfur compound blended in the rubber material, a thiophenol, a diphenyl disulfide and their derivatives are widely used. It is considered that the resilience improvement effect can be increased if the substituent group of these organic sulfur compounds is changed. However, there existed a problem that if an organic sulfur compound which is hardly soluble in a base rubber is used, the reactivity between the base rubber and the organic sulfur compound is not increased, and the resilience is not enhanced.

The present invention has been made in view of the above described situations, and an object of the present invention is to increase the resilience performance of the constituent member formed from a rubber composition by adding an organic sulfur compound which is easily soluble in the base rubber and has high reactivity with the base rubber, in the rubber composition, and to provide a golf ball having excellent resilience performance.

The present invention which has solved the above problems provides a golf ball comprising a constituent member, wherein at least a part of the constituent member is formed from a rubber composition containing (a) a base rubber, (b) a co-crosslinking agent, (c) a crosslinking initiator, and (d) an organic sulfur compound, wherein (d) the organic sulfur compound contains at least one member selected from the group consisting of a thiophenol having a halogenated sulfanyl group, a metal salt of a thiophenol having a halogenated sulfanyl group, and a diphenyl disulfide having a halogenated sulfanyl group.

The halogenated sulfanyl group is strongly electron withdrawing and highly lipid-soluble. Accordingly, the organic sulfur compound having the halogenated sulfanyl group is easily soluble in the base rubber and has high reactivity with the base rubber. Thus, if these organic sulfur compounds are used, the resilience performance of the constituent member formed from the rubber composition is increased.

According to the present invention, a golf ball having excellent resilience performance is obtained.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a constituent member, wherein at least a part of the constituent member is formed from a rubber composition containing (a) a base rubber, (b) a co-crosslinking agent, (c) a crosslinking initiator, and (d) an organic sulfur compound.

(d) Organic Sulfur Compound

Firstly, (d) the organic sulfur compound used in the present invention will be explained. (d) The organic sulfur compound contains (d1) a special organic sulfur compound which is at least one member selected from the group consisting of a thiophenol having a halogenated sulfanyl group, a metal salt of a thiophenol having a halogenated sulfanyl group, and a diphenyl disulfide having a halogenated sulfanyl group. (d1) The organic sulfur compound may be used solely, or two or more of them may be used in combination. The halogenated sulfanyl group is strongly electron withdrawing and highly lipid-soluble. Accordingly, (d1) the organic sulfur compound having the halogenated sulfanyl group is easily soluble in the base rubber and has high reactivity with the base rubber. Thus, if these (d1) organic sulfur compounds are used, the resilience performance of the constituent member formed from the rubber composition can be increased.

(d1) The organic sulfur compound preferably has a structure represented by the formula (1).

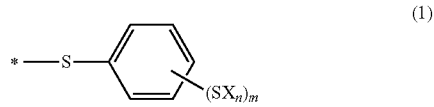

(1)

[In the formula (1), X represents a halogen atom, n represents an integer of 1 to 5, m represents an integer of 1 to 5, a plurality of X may be identical to or different from each other when n or m is 2 or more, and * represents a bonding position.]

Examples of the halogen atom include fluorine, chlorine, bromine and iodine, fluorine or chlorine is preferable, fluorine is more preferable. The above n is preferably 3 or more, more preferably 4 or more, and even more preferably 5. Examples of the halogenated sulfanyl group (—$SX_n$) in the formula (1) include fluorosulfanyl group (—SF), difluorosulfanyl group (—$SF_2$), trifluorosulfanyl group (—$SF_3$), tetrafluorosulfanyl group (—$SF_4$), pentafluorosulfanyl group (—$SF_5$), and tetrafluorochlorosulfanyl group (—$SF_4Cl$), and trifluorosulfanyl group, pentafluorosulfanyl group and tetrafluorochlorosulfanyl group are preferable.

The above m is preferably 1 or more, more preferably 2 or more, even more preferably 3 or more, and most preferably 5. Preferable examples of the structure represented by the formula (1) include a structure having one halogenated sulfanyl group at 4-position, a structure having two halogenated sulfanyl groups at 2,6-position, a structure having two halogenated sulfanyl groups at 3,5-position, a structure having three halogenated sulfanyl groups at 2,4,5-position, a structure having three halogenated sulfanyl groups at 2,4,6-position, and a structure having five halogenated sulfanyl groups at 2,3,4,5,6-position, when the bonding position of the sulfur (—S—) on the benzene ring is regarded as 1-position.

In the structure represented by the formula (1), the solubility parameter value (hereinafter sometimes referred to as "SP value") of the structure represented by the formula (11) is preferably 15.5 $(J/cm^3)^{1/2}$ or more, more preferably 15.7 $(J/cm^3)^{1/2}$ or more, and even more preferably 15.8 $(J/cm^3)^{1/2}$ or more, and is preferably 21.0 $(J/cm^3)^{1/2}$ or less, more preferably 19.39 $(J/cm^3)^{1/2}$ or less, and even more preferably 18.5 $(J/cm^3)^{1/2}$ or less. If the SP value falls within the above range, (d) the organic sulfur compound is easily soluble in (a) the base rubber, and the constituent member obtained from the rubber composition has further enhanced resilience.

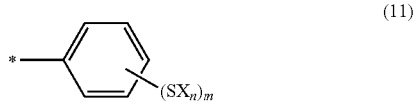
(11)

[In the formula (11), X, n and m have the same meaning as those in the formula (1), and * represents a bonding position.]

The solubility parameter value (SP value) is δt defined by the following formula.

$$\delta d = \frac{\Sigma F_{di}}{V}, \delta p = \frac{\sqrt{\Sigma F_{pi}^2}}{V}, \delta h = \frac{\sqrt{\Sigma E_{hi}}}{V}$$

$$\delta_t^2 = \delta_d^2 + \delta_p^2 + \delta_h^2$$

In the formula, V is a volume V ($cm^3$/mol) according to Fedors, and Fdi, Fpi and Ehi are solubility parameter components according to the method of Hoftyzer and Van Krevelen. δd is a London dispersion force, δp is a polar force, and δh is a hydrogen bonding force. The detailed method for calculating the SP value is described in Chapter 7, Properties of Polymers (D. W. VANKREVELEN, Publisher: ELSEVIER, Published year: Third impression 2003). Fdi, Fpi, Ehi and V of main structures are shown in Table 1.

TABLE 1

| Structural group | $F_{di}$ [$J^{1/2} \cdot cm^{3/2} \cdot mol^{-1}$] | $F_{pi}$ [$J^{1/2} \cdot cm^{3/2} \cdot mol^{-1}$] | $E_{hi}$ [$J \cdot mol^{-1}$] | V [$cm^3 \cdot mol^{-1}$] |
|---|---|---|---|---|
| —CH$_3$ | 420 | 0 | 0 | 33.5 |
| —CH$_2$— | 270 | 0 | 0 | 16.1 |
| >CH— | 80 | 0 | 0 | −1 |
| >C< | −70 | 0 | 0 | −19.2 |
| =CH$_2$ | 400 | 0 | 0 | 28.5 |
| =CH— | 200 | 0 | 0 | 13.5 |
| =C< | 70 | 0 | 0 | −5.5 |
| Cyclohexyl | 1620 | 0 | 0 | 77.3 |
| Phenyl | 1430 | 110 | 0 | 71.4 |
| Phenylene | 1270 | 110 | 0 | 52.4 |
| —F | 220 | 0 | 0 | 18 |
| —Cl | 450 | 550 | 400 | 24 |
| —Br | 550 | 0 | 0 | 30 |
| —CN | 430 | 1100 | 2500 | 24 |
| —OH | 210 | 500 | 20000 | 13 |
| —O— | 100 | 400 | 3000 | 3.8 |
| —COH | 470 | 800 | 4500 | 22.3 |
| —CO— | 290 | 770 | 2000 | 10.8 |
| —COOH | 530 | 420 | 10000 | 28.5 |

TABLE 1-continued

| Structural group | $F_{di}$ [$J^{1/2} \cdot cm^{3/2} \cdot mol^{-1}$] | $F_{pi}$ [$J^{1/2} \cdot cm^{3/2} \cdot mol^{-1}$] | $E_{hi}$ [$J \cdot mol^{-1}$] | V [$cm^3 \cdot mol^{-1}$] |
|---|---|---|---|---|
| —COO— | 390 | 490 | 7000 | 18 |
| HCOO— | 530 | 0 | 0 | 32.5 |
| —NH$_2$ | 280 | 0 | 8400 | 19.2 |
| —NH— | 160 | 210 | 3100 | 4.5 |
| —N< | 20 | 800 | 5000 | −9 |
| —NO$_2$ | 500 | 1070 | 1500 | 32 |
| —S— | 440 | 0 | 0 | 12 |
| =PO$_4$— | 740 | 1890 | 13000 | 28 |
| Ring | 190 | 0 | 0 | 16 |

Examples of the structure represented by the formula (11) having a SP value falling within the above described numerical range include 4-(pentafluorosulfanyl)phenyl group (SP value: 18.21 $(J/cm^3)^{1/2}$), 4-(trifluorosulfanyl)phenyl group (SP value: 20.04 $(J/cm^3)^{1/2}$), 4-(tetrafluorochlorosulfanyl)phenyl group (SP value: 19.34 $(J/cm^3)^{1/2}$), 3,5-bis(pentafluorosulfanyl)phenyl group (SP value: 16.97 $(J/cm^3)^{1/2}$), 2,4,6-tri(pentafluorosulfanyl)phenyl group (SP value: 16.44 $(J/cm^3)^{1/2}$), and 2,3,4,5,6-penta(pentafluorosulfanyl)phenyl group (SP value: 15.95 $(J/cm^3)^{1/2}$).

As (d) the organic sulfur compound, at least one member selected from the group consisting of a compound represented by the formula (2), a compound represented by the formula (3), and a compound represented by the formula (4), is preferable.

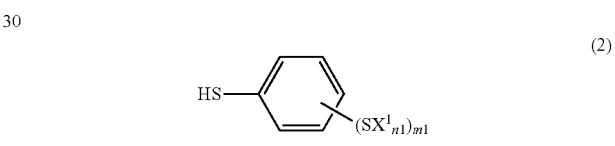
(2)

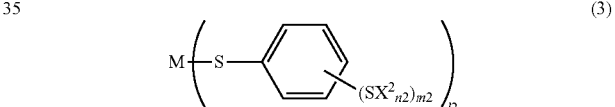
(3)

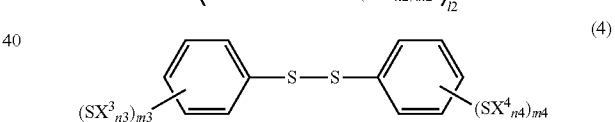
(4)

[In the formula (2), $X^1$ represents a halogen atom, n1 represents an integer of 1 to 5, m1 represents an integer of 1 to 5, and a plurality of $X^1$ may be identical to or different from each other when n1 or m1 is 2 or more.

In the formula (3), $X^2$ represents a halogen atom, M represents a metal atom, n2 represents an integer of 1 to 5, m2 represents an integer of 1 to 5, l2 represents 1 or 2, and a plurality of $X^2$ may be identical to or different from each other when n2 or m2 is 2 or more.

In the formula (4), $X^3$ and $X^4$ represent a halogen atom, n3 represents an integer of 1 to 5, m3 represents an integer of 1 to 5, a plurality of $X^3$ may be identical to or different from each other when n3 or m3 is 2 or more, n4 represents an integer of 1 to 5, m4 represents an integer of 1 to 5, and a plurality of $X^4$ may be identical to or different from each other when n4 or m4 is 2 or more.]

In the formulae (2) to (4), examples of the halogen atom represented by $X^1$ to $X^4$ include fluorine, chlorine, bromine and iodine, and fluorine or chlorine is preferable, fluorine is more preferable.

In the formulae (2) to (4), n1, n2, n3 and n4 are preferably 3 or more, more preferably 4 or more, and even more preferably 5.

In the formulae (2) to (4), m1, m2, m3 and m4 are preferably 1 or more, more preferably 2 or more, even more preferably 3 or more, and most preferably 5.

In the formula (3), examples of the monovalent metal atom represented by M include sodium, lithium, potassium, copper (I) and silver (I), and examples of the divalent metal atom represented by M include zinc, magnesium, calcium, strontium, barium, titanium (II), manganese (II), iron (II), cobalt (II), nickel (II), zirconium (II) and tin (II).

As (d) the organic sulfur compound, at least one member selected from the group consisting of a compound represented by the formula (5), a compound represented by the formula (6), and a compound represented by the formula (7), is more preferable.

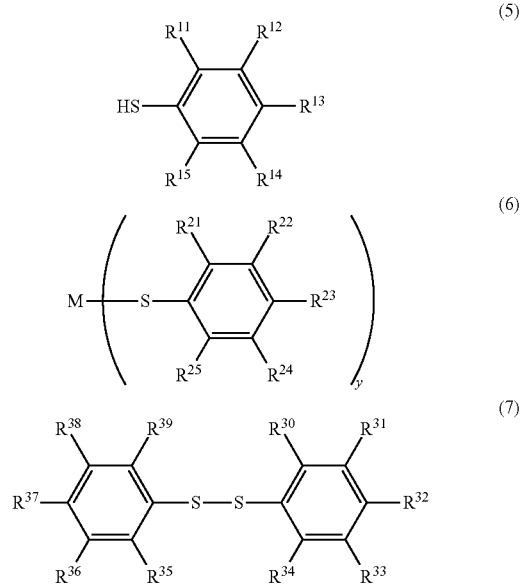

[In the formulae (5) to (7), $R^{11}$ to $R^{15}$, $R^{21}$ to $R^{25}$, and $R^{30}$ to $R^{39}$ are identical to or different from each other and represent a hydrogen atom, a fluorosulfanyl group (—SF), a difluorosulfanyl group (—SF$_2$), a trifluorosulfanyl group (—SF$_3$), a tetrafluorosulfanyl group (—SF$_4$), a pentafluorosulfanyl group (—SF$_5$) or a tetrafluorochlorosulfanyl group (—SF$_4$Cl). It is noted that at least one group of $R^{11}$ to $R^{15}$ is a substituent group other than a hydrogen atom, at least one group of $R^{21}$ to $R^{25}$ is a substituent group other than a hydrogen atom, and at least one group of $R^{30}$ to $R^{39}$ is a substituent group other than a hydrogen atom. M represents a metal atom. y represents 1 or 2.]

Specific examples of the compound represented by the formula (5) include 4-(pentafluorosulfanyl)thiophenol, 4-(trifluorosulfanyl)thiophenol, 4-(tetrafluorochlorosulfanyl)thiophenol, 2,6-bis(pentafluorosulfanyl)thiophenol, 3,5-bis(pentafluorosulfanyl)thiophenol, 2,4,5-tri(pentafluorosulfanyl)thiophenol, 2,4,6-tri(pentafluorosulfanyl)thiophenol, and 2,3,4,5,6-penta(pentafluorosulfanyl)thiophenol.

Specific examples of the compound represented by the formula (6) include zinc salt of 4-(pentafluorosulfanyl)thiophenol, zinc salt of 4-(trifluorosulfanyl)thiophenol, zinc salt of 4-(tetrafluorochlorosulfanyl)thiophenol, zinc salt of 2,6-bis(pentafluorosulfanyl)thiophenol, zinc salt of 3,5-bis(pentafluorosulfanyl)thiophenol, zinc salt of 2,4,5-tri(pentafluorosulfanyl)thiophenol, zinc salt of 2,4,6-tri(pentafluorosulfanyl)thiophenol, zinc salt of 2,3,4,5,6-penta(pentafluorosulfanyl)thiophenol.

Specific examples of the compound represented by the formula (7) include bis[4-(pentafluorosulfanyl)phenyl]disulfide, bis[4-(trifluorosulfanyl)phenyl]disulfide, bis[4-(tetrafluorochlorosulfanyl)phenyl]disulfide, bis[2,6-bis(pentafluorosulfanyl)phenyl]disulfide, bis[3,5-bis(pentafluorosulfanyl)phenyl]disulfide, bis[2,4,5-tri(pentafluorosulfanyl)phenyl]disulfide, bis[2,4,6-tri(pentafluorosulfanyl)phenyl]disulfide, and bis[2,3,4,5,6-penta(pentafluorosulfanyl)phenyl]disulfide.

As (d) the organic sulfur compound, at least one member selected from the group consisting of 4-(pentafluorosulfanyl)thiophenol, 4-(trifluorosulfanyl)thiophenol, 4-(tetrafluorochlorosulfanyl)thiophenol, 2,4,6-tri(pentafluorosulfanyl)thiophenol, 2,3,4,5,6-penta(pentafluorosulfanyl)thiophenol, 3,5-di(pentafluorosulfanyl)thiophenol, bis[3,5-bis(pentafluorosulfanyl)phenyl]disulfide and bis[4-(pentafluorosulfanyl)phenyl]disulfide, are preferable.

(d) The organic sulfur compound may contain (d2) other organic sulfur compound than the thiophenol having the halogenated sulfanyl group, the metal salt of the thiophenol having the halogenated sulfanyl group, and the diphenyl disulfide having the halogenated sulfanyl group.

Examples of (d2) the other organic sulfur compound include at least one member selected from the group consisting of thiophenols, thionaphthols, polysulfides, thiurams, thiocarboxylic acids, dithiocarboxylic acids, sulfenamides, dithiocarbamates, thiazoles, and metal salts thereof.

Examples of the thiols include thiophenols and thionaphthols. Examples of the thiophenols include thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol, and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol, and pentaiodothiophenol; and metal salts thereof. As the metal salt, a zinc salt is preferable.

Examples of the thionaphthols (naphthalene thiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof, and 2-thionaphthol, 1-thionaphthol and their metal salts are preferable. As the metal salt, a divalent metal salt is preferable, a zinc salt is more preferable. Specific examples of the metal salt include zinc salt of 1-thionaphthol and zinc salt of 2-thionaphthol.

The polysulfides are an organic sulfur compound having a polysulfide bond, examples thereof include disulfides, trisulfides and tetrasulfides. As the polysulfides, diphenyl polysulfides are preferable.

Examples of the diphenyl polysulfides include diphenyl disulfide; diphenyl disulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)

disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl) disulfide, bis(2,4,5,6-tetrachlorophenyl)disulfide, bis(pentachlorophenyl)disulfide, bis(4-bromophenyl)disulfide, bis (2,5-dibromophenyl)disulfide, bis(2,6-dibromophenyl) disulfide, bis(2,4,5-tribromophenyl)disulfide, bis(2,4,5,6-tetrabromophenyl)disulfide, bis(pentabromophenyl) disulfide, bis(4-iodophenyl)disulfide, bis(2,5-diiodophenyl) disulfide, bis(2,6-diiodophenyl)disulfide, bis(2,4,5-triiodophenyl)disulfide, bis(2,4,5,6-tetraiodophenyl) disulfide and bis(pentaiodophenyl)disulfide; and diphenyl disulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide and bis(penta-t-butylphenyl)disulfide.

Examples of the thiurams include thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. Examples of the thiocarboxylic acids include a naphthalene thiocarboxylic acid. Examples of the dithiocarboxylic acids include a naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

When (d2) the other organic sulfur compound is used as (d) the organic sulfur compound, the total amount of (d1) the thiophenol having the halogenated sulfanyl group, the metal salt of the thiophenol having the halogenated sulfanyl group and the diphenyl disulfide having the halogenated sulfanyl group in all the organic sulfur compounds is preferably 50 mass % or more, more preferably 70 mass % or more, and even more preferably 90 mass % or more. It is also preferable that (d) the organic sulfur compound consists of the thiophenol having the halogenated sulfanyl group, the metal salt of the thiophenol having the halogenated sulfanyl group, or the diphenyl disulfide having the halogenated sulfanyl group.

The total amount of (d) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (d) the organic sulfur compound is 0.05 part by mass or more, the effect of adding (d) the organic sulfur compound is greater and thus the resilience improvement effect for the golf ball is greater, and if the amount of (d) the organic sulfur compound is 5.0 parts by mass or less, the compression deformation amount of the obtained golf ball is not excessively great and thus the resilience is further enhanced.

Next, other materials used in the rubber composition will be explained.

(a) Base Rubber

As (a) the base rubber, a natural rubber and/or a synthetic rubber may be used. For example, a nonpolar rubber such as polybutadiene rubber, natural rubber, polyisoprene rubber, styrene polybutadiene rubber, and ethylene-propylene-diene rubber (EPDM) may be used. These rubbers may be used solely or in combination of at least two of them. The SP value of the nonpolar rubber ranges from 14.70 $(J/cm^3)^{1/2}$ to 18.60 $(J/cm^3)^{1/2}$ (a) The base rubber preferably contains a nonpolar rubber. The amount of the nonpolar rubber in (a) the base rubber is preferably 50 mass % or more, more preferably 70 mass % or more, and even more preferably 90 mass % or more. It is also preferable that (a) the base rubber consists of the nonpolar rubber. Among the nonpolar rubbers, typically preferable is a high-cis polybutadiene having a cis-1,4 bond in an amount of 40 mass % or more, preferably 80 mass % or more, more preferably 90 mass % or more in view of its superior resilience property. The amount of the high-cis polybutadiene in (a) the base rubber is preferably 50 mass % or more, more preferably 70 mass % or more. (a) The base rubber may consist of the high-cis polybutadiene.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferable.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability may deteriorate, and if the molecular weight distribution (Mw/Mn) of the high-cis polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

The Mooney viscosity ($ML_{1+4}$ (100° C.)) of the high-cis polybutadiene is preferably 30 or more, more preferably 32 or more, and even more preferably 35 or more, and is preferably 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of preheating time: 1 minute, rotor rotation time: 4 minutes, and temperature: 100° C.

The rubber composition preferably contains at least two high-cis polybutadienes which have a Mooney viscosity ($ML_{1+4}$ (100° C.)) different from each other as (a) the base rubber, more preferably contains two high-cis polybutadienes which have a Mooney viscosity ($ML_{1+4}$ (100° C.)) different from each other as (a) the base rubber. When two high-cis polybutadienes are contained, it is preferable that the first high-cis polybutadiene has a Mooney viscosity ($ML_{1+4}$ (100° C.)) of less than 50, and the second high-cis polybutadiene has a Mooney viscosity ($ML_{1+4}$ (100° C.)) of 50 or more.

The Mooney viscosity ($ML_{1+4}$ (100° C.)) of the first high-cis polybutadiene is preferably 30 or more, more preferably 32 or more, and even more preferably 35 or more, and is preferably less than 50, more preferably 49 or less, and even more preferably 48 or less. The Mooney viscosity (ML$_{1+4}$ (100° C.)) of the second high-cis polybutadiene is preferably 50 or more, more preferably 52 or more, and even more preferably 54 or more, and is preferably 100 or less, more preferably 90 or less, even more preferably 80 or less, and most preferably 70 or less.

The mass ratio (first high-cis polybutadiene/second high-cis polybutadiene) of the first high-cis polybutadiene to the second high-cis polybutadiene in (a) the base rubber is preferably 0.3 or more, more preferably 0.5 or more, and even more preferably 0.7 or more, and is preferably 3.0 or less, more preferably 2.0 or less, and even more preferably 1.5 or less.

It is also preferable that the rubber composition contains polybutadiene rubber and polyisoprene rubber as (a) the base rubber. The Mooney viscosity (ML$_{1+4}$ (100° C.)) of the polyisoprene rubber is preferably 55 or more, more preferably 60 or more, and even more preferably 65 or more, and is preferably 120 or less, more preferably 110 or less, and even more preferably 100 or less.

The mass ratio (polybutadiene rubber/polyisoprene rubber) of the polybutadiene rubber to the polyisoprene rubber in (a) the base rubber is preferably 1 or more, more preferably 2 or more, and even more preferably 4 or more, and is preferably 20 or less, more preferably 15 or less, and even more preferably 10 or less.

The SP value of the main component (the component in a maximum amount) of (a) the base rubber is preferably 14.70 (J/cm$^3$)$^{1/2}$ or more, more preferably 15.75 (J/cm$^3$)$^{1/2}$ or more, and is preferably 18.60 (J/cm$^3$)$^{1/2}$ or less, more preferably 17.80 (J/cm$^3$)$^{1/2}$ or less, and even more preferably 17.60 (J/cm$^3$)$^{1/2}$ or less. Further, the SP value difference (absolute value) between (d1) the organic sulfur compound and the main component of (a) the base rubber is preferably 6.30 (J/cm$^3$)$^{1/2}$ or less, more preferably 4.69 (J/cm$^3$)$^{1/2}$ or less, and even more preferably 3.64 (J/cm$^3$)$^{1/2}$ or less. If the SP value difference (absolute value) falls within the above range, the compatibility with (d1) the organic sulfur compound is further enhanced. It is noted that, regarding the SP value of the base rubber, for example, the polybutadiene rubber has a SP value of 17.19 (J/cm$^3$)$^{1/2}$, and the isoprene rubber has a SP value in a range of from 16.2 to 17.09 (J/cm$^3$)$^{1/2}$ (b) Co-Crosslinking Agent (b) The α,β-unsaturated carboxylic acid having 3 to 8 carbon atoms and/or the metal salt thereof is blended as a co-crosslinking agent in the rubber composition, and has an action of crosslinking a rubber molecule by graft polymerization to a base rubber molecular chain. The α,β-unsaturated carboxylic acid used as (b) the co-crosslinking agent preferably has 3 to 8 carbon atoms, more preferably has 3 to 6 carbon atoms, and even more preferably has 3 or 4 carbon atoms. It is noted that the α,β-unsaturated carboxylic acid having 3 to 8 carbon atoms and/or the metal salt thereof may be used solely, or two or more of them may be used in combination.

Examples of the α,β-unsaturated carboxylic acid having 3 to 8 carbon atoms include acrylic acid, methacrylic acid, fumaric acid, maleic acid, and crotonic acid. In the case that the rubber composition contains only the α,β-unsaturated carboxylic acid having 3 to 8 carbon atoms as the co-crosslinking agent, the rubber composition further contains (e) a metal compound as an essential component. This is because neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms as the co-crosslinking agent.

Examples of the metal constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ions such as tin, and zirconium. The metal component may be used solely or as a mixture of at least two of them. Among them, as the metal component, the divalent metal such as magnesium, calcium, zinc, barium, and cadmium are preferable.

This is because use of the divalent metal salt of the α,β-unsaturated carboxylic acid having 3 to 8 carbon atoms easily generates a metal crosslinking between the rubber molecules. Especially, as the divalent metal salt, zinc salt of the α,β-unsaturated carboxylic acid having 3 to 8 carbon atoms is preferable, zinc acrylate is more preferable, because the zinc salt enhances the resilience of the obtained golf ball. It is noted that in case of using the α,β-unsaturated carboxylic acid having 3 to 8 carbon atoms and the metal salt thereof in combination as the co-crosslinking agent, (e) the metal compound may be used as an optional component.

The SP value of (b) the co-crosslinking agent is preferably 18.0 (J/cm$^3$)$^{1/2}$ or more, more preferably 19.0 (J/cm$^3$)$^{1/2}$ or more, and even more preferably 20.0 (J/cm$^3$)$^{1/2}$ or more, and is preferably 24.0 (J/cm$^3$)$^{1/2}$ or less, more preferably 23.0 (J/cm$^3$)$^{1/2}$ or less, and even more preferably 22.0 (J/cm$^3$)$^{1/2}$ or less. (b) The co-crosslinking agent having a SP value falling within the above range has better compatibility with (d1) the organic sulfur compound. Further, the SP value difference (absolute value) between (d1) the organic sulfur compound and (b) the co-crosslinking agent is preferably 6.0 (J/cm$^3$)$^{1/2}$ or less, more preferably 5.0 (J/cm$^3$)$^{1/2}$ or less, and even more preferably 4.0 (J/cm$^3$)$^{1/2}$ or less. If the SP value difference (absolute value) falls within the above range, the compatibility with (d1) the organic sulfur compound is further enhanced. It is noted that, regarding the SP value of the co-crosslinking agent, for example, acrylic acid has a SP value of 20.84 (J/cm$^3$)$^{1/2}$, and methacrylic acid has a SP value of 20.52 (J/cm$^3$)$^{1/2}$.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is 15 parts by mass or more, an appropriate hardness can be obtained for the constituent member formed from the rubber composition containing a small amount of (c) the crosslinking initiator, which further enhances the resilience of the golf ball. On the other hand, if the amount of the α,β-unsaturated carboxylic acid having 3 to 8 carbon atoms and/or the metal salt thereof is 50 parts by mass or less, the constituent member formed from the rubber composition does not become excessively hard, and thus the shot feeling of the golf ball is better.

(c) Crosslinking Initiator (c) The crosslinking initiator is blended in order to crosslink (a) the base rubber component. As (c) the crosslinking initiator, an organic peroxide is preferable. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)

hexane, and di-t-butylperoxide. These organic peroxides may be used solely or in combination of at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, even more preferably 2.0 parts by mass or less, and most preferably 0.9 part by mass or less, with respect to 100 parts by mass of (a) the base rubber. If the amount of (c) the crosslinking initiator is 0.2 part by mass or more, the constituent member formed from the rubber composition does not become excessively soft, and thus the resilience of the golf ball is better. If the amount of (c) the crosslinking initiator is 5.0 parts by mass or less, an appropriate hardness can be obtained for the constituent member formed from the rubber composition, and thus the resilience and durability of the golf ball is better.

(e) Metal Compound

In the case that the rubber composition used in the present invention contains only the $\alpha,\beta$-unsaturated carboxylic acid having 3 to 8 carbon atoms as the co-crosslinking agent, the rubber composition further contains (e) a metal compound as an essential component. (e) The metal compound is not particularly limited as long as it neutralizes (b) the $\alpha,\beta$-unsaturated carboxylic acid having 3 to 8 carbon atoms in the rubber composition. Examples of (e) the metal compound include a metal hydroxide such as magnesium hydroxide, zinc hydroxide, calcium hydroxide, sodium hydroxide, lithium hydroxide, potassium hydroxide and copper hydroxide; a metal oxide such as magnesium oxide, calcium oxide, zinc oxide and copper oxide; and a metal carbonate such as magnesium carbonate, zinc carbonate, calcium carbonate, sodium carbonate, lithium carbonate and potassium carbonate. (e) The metal compound is preferably a divalent metal compound, more preferably a zinc compound. This is because the divalent metal compound reacts with the $\alpha,\beta$-unsaturated carboxylic acid having 3 to 8 carbon atoms, thereby forming a metal crosslinking. Further, use of the zinc compound provides a golf ball with higher resilience. (e) The metal compound may be used solely or as a mixture of at least two of them. The amount of (e) the metal compound can be appropriately adjusted in accordance with the desired neutralization degree of (b) the $\alpha,\beta$-unsaturated carboxylic acid having 3 to 8 carbon atoms and (d) the unsaturated aliphatic carboxylic acid.

(f) Carboxylic Acid and/or Salt Thereof

The rubber composition may contain (f) a carboxylic acid and/or a salt thereof. If (f) the carboxylic acid and/or the salt thereof is contained, the obtained spherical core has a greater degree of outer-hard and inner-soft structure. Examples of (f) the carboxylic acid and/or the salt thereof include an aliphatic carboxylic acid, a salt of an aliphatic carboxylic acid, an aromatic carboxylic acid and a salt of an aromatic carboxylic acid. (f) The carboxylic acid and/or the salt thereof may be used solely or as a mixture of at least two of them. It is noted that (f) the carboxylic acid and/or the salt thereof is a compound different from the compound used as (b) the co-crosslinking agent, and excludes an $\alpha,\beta$-unsaturated carboxylic acid having 3 to 8 carbon atoms and a metal salt thereof.

The aliphatic carboxylic acid may be either a saturated aliphatic carboxylic acid (hereinafter sometimes referred to as "saturated fatty acid") or an unsaturated aliphatic carboxylic acid (hereinafter sometimes referred to as "unsaturated fatty acid"). In addition, the aliphatic carboxylic acid may have a branched structure or a cyclic structure. The saturated fatty acid preferably has 1 or more carbon atoms, and preferably has 30 or less carbon atoms, more preferably has 18 or less carbon atoms, and even more preferably has 13 or less carbon atoms. The unsaturated fatty acid preferably has 5 or more carbon atoms, more preferably has 7 or more carbon atoms, and even more preferably has 8 or more carbon atoms, and preferably has 30 or less carbon atoms, more preferably has 18 or less carbon atoms, and even more preferably has 13 or less carbon atoms.

Examples of the aromatic carboxylic acid include a carboxylic acid having a benzene ring in the molecule, and a carboxylic acid having a heteroaromatic ring in the molecule. The aromatic carboxylic acid may be used solely, or two or more of them may be used in combination. Examples of the carboxylic acid having the benzene ring include an aromatic carboxylic acid having a carboxyl group directly bonding to a benzene ring, an aromatic-aliphatic carboxylic acid having an aliphatic carboxylic acid bonding to a benzene ring, a polynuclear aromatic carboxylic acid having a carboxyl group directly bonding to a fused benzene ring, and a polynuclear aromatic-aliphatic carboxylic acid having an aliphatic carboxylic acid bonding to a fused benzene ring. Examples of the carboxylic acid having the heteroaromatic ring include a carboxylic acid having a carboxyl group directly bonding to a heteroaromatic ring.

As the salt of the aliphatic carboxylic acid or the salt of the aromatic carboxylic acid, a salt of the above described aliphatic carboxylic acid or aromatic carboxylic acid can be used. Examples of the cation component of the above salt include a metal ion, an ammonium ion, and an organic cation. Examples of the metal ion include a monovalent metal ion such as sodium, potassium, lithium, and silver; a divalent metal ion such as magnesium, calcium, zinc, barium, cadmium, copper, cobalt, nickel, and manganese; a trivalent metal ion such as aluminum, and iron; and other metal ions such as tin, zirconium, and titanium. The cation component may be used solely, or two or more of them may be used in combination.

The organic cation is a cation having a carbon chain. The organic cation is not particularly limited, and examples thereof include an organic ammonium ion. Examples of the organic ammonium ion include a primary ammonium ion such as stearyl ammonium ion, hexyl ammonium ion, octyl ammonium ion and 2-ethylhexyl ammonium ion; a secondary ammonium ion such as dodecyl(lauryl) ammonium ion and octadecyl(stearyl) ammonium ion; a tertiary ammonium ion such as trioctyl ammonium ion; and a quaternary ammonium ion such as dioctyldimethyl ammonium ion and distearyldimethyl ammonium ion. These organic cations may be used solely, or two or more of them may be used in combination.

Examples of the aliphatic carboxylic acid and/or the salt thereof include a saturated fatty acid and/or a salt thereof, and an unsaturated fatty acid and/or a salt thereof. The saturated fatty acid and/or the salt thereof is preferable, caprylic acid (octanoic acid), pelargonic acid (nonanoic acid), capric acid (decanoic acid), lauric acid, myristic acid, palmitic acid, stearic acid, behenic acid, and their potassium salt, magnesium salt, calcium salt, aluminum salt, zinc salt, iron salt, copper salt, nickel salt, cobalt salt are more preferable. As the unsaturated fatty acid and/or the salt thereof, palmitoleic acid, oleic acid, linoleic acid, arachidic acid, and their potassium salt, magnesium salt, calcium salt, aluminum salt, zinc salt, iron salt, copper salt, nickel salt, cobalt salt are preferable.

As the aromatic carboxylic acid and/or the salt thereof, benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalenecarboxylic acid, anthracenecarboxylic acid, furancarboxylic acid, thenoic acid, and their potassium salt, magnesium salt, calcium salt, aluminum salt, zinc salt, iron salt, copper salt, nickel salt, cobalt salt are particularly preferable.

The amount of (f) the carboxylic acid and/or the salt thereof, for example, is preferably 0.5 part by mass or more, more preferably 1.0 part by mass or more, and even more preferably 1.5 parts by mass or more, and is preferably 40 parts by mass or less, more preferably 35 parts by mass or less, and even more preferably 30 parts by mass or less, with respect to 100 parts by mass of (a) the base rubber. If the amount of (f) the carboxylic acid and/or the salt thereof is 0.5 part by mass or more, the spherical core has a greater degree of outer-hard and inner-soft structure, and if the amount of (f) the carboxylic acid and/or the salt thereof is 40 parts by mass or less, lowering in the core hardness is suppressed, and the resilience is better.

The rubber composition may contain an additive such as a pigment, a filler for adjusting a weight or the like, an antioxidant, a peptizing agent and a softening agent, where necessary. In addition, the rubber composition may contain a rubber powder obtained by pulverizing a golf ball core or offcuts produced when preparing a core.

Examples of the pigment blended into the rubber composition include a white pigment, a blue pigment and a purple pigment. As the white pigment, titanium oxide is preferably used. The type of titanium oxide is not particularly limited, but rutile type is preferably used because of its high opacity. In addition, the amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferable that the rubber composition contains both a white pigment and a blue pigment. The blue pigment is blended in order to cause white color to be vivid, and examples thereof include ultramarine blue, cobalt blue, and phthalocyanine blue. In addition, examples of the purple pigment include anthraquinone violet, dioxazine violet, and methyl violet.

The filler blended in the rubber composition is used as a weight adjusting agent for mainly adjusting the weight of the golf ball obtained as a final product. The filler may be blended where necessary. Examples of the filler include an inorganic filler such as zinc oxide, barium sulfate, calcium carbonate, magnesium oxide, tungsten powder, and molybdenum powder.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

Preparation of Rubber Composition

The rubber composition used in the present invention is obtained by mixing and kneading (a) the base rubber, (b) the co-crosslinking agent, (c) the crosslinking initiator, (d) the organic sulfur compound, and optionally other additives. The kneading method is not particularly limited, for example, the kneading may be conducted with a conventional kneading machine such as a kneading roll, a banbury mixer and a kneader.

Golf Ball

In the golf ball according to the present invention, at least a part of the constituent member of the golf ball is formed from the rubber composition containing (a) the base rubber, (b) the co-crosslinking agent, (c) the crosslinking initiator, and (d) the organic sulfur compound. The constituent member is not particularly limited, and examples thereof include a body of a one-piece golf ball, and a spherical core of a golf ball composed of the spherical core and a cover.

Examples of the golf ball according to the present invention include a one-piece golf ball in which the golf ball body is formed from the rubber composition; a two-piece golf ball comprising a single layered spherical core and a cover covering the spherical core, in which the spherical core is formed from the rubber composition; and a multi-piece golf ball (including a three-piece golf ball) comprising a multiple layered core composed of a spherical center and at least one intermediate layer covering the spherical center, and a cover covering the multiple layered core, in which the center and/or at least one layer of the intermediate layers is formed from the rubber composition.

When the golf ball according to the present invention is a one-piece golf ball having a diameter in a range of from 42.67 mm to 42.82 mm, the compression deformation amount of the golf ball (shrinking amount of the golf ball along the compression direction) when applying a load from 98 N as an initial load to 1275 N as a final load to the golf ball is preferably 2.3 mm or more, more preferably 2.4 mm or more, and even more preferably 2.5 mm or more, and is preferably 4.0 mm or less, more preferably 3.9 mm or less, and even more preferably 3.8 mm or less. If the compression deformation amount is 2.3 mm or more, the one-piece golf ball does not become excessively hard, and thus the shot feeling thereof becomes better. If the compression deformation amount is 4.0 mm or less, the one-piece golf ball does not become excessively soft, and thus the resilience thereof becomes higher.

Next, the core in the case that the golf ball according to the present invention is a two-piece golf ball, a three-piece golf ball or a multi-piece golf ball, will be explained.

Examples of the construction of the core of the golf ball according to the present invention include a single layered core; and a multiple layered core composed of a center and at least one intermediate layer covering the center. In case of the multiple layered core, at least one layer thereof is formed from the above described rubber composition, but the volume of the layer obtained from the above described rubber composition is preferably 30% or more of the entire core, more preferably 50% or more of the entire core, and even more preferably 70% or more of the entire core. In addition, all the layers of the multiple layered core may be formed from the above described rubber composition, but it is preferable that the innermost center is formed from the above described rubber composition. It is noted that the core of the golf ball according to the present invention is most preferably a single layered core formed from the above described rubber composition.

The diameter of the spherical core is preferably 32.8 mm or more, more preferably 33.6 mm or more, and is preferably 42.2 mm or less, more preferably 41.8 mm or less. If the diameter of the spherical core is less than 32.8 mm, the thickness of the cover is thicker than the desired thickness, and thus the resilience may be lowered. On the other hand, if the diameter of the spherical core is more than 42.2 mm, the thickness of the cover is lower than the desired thickness, the durability of the cover may be lowered.

When the core has a diameter in a range of from 32.8 mm to 42.2 mm, the compression deformation amount of the core (shrinking amount of the core along the compression direction) when applying a load from 98 N as an initial load to 1275 N as a final load to the core is preferably 2.0 mm or more, more preferably 2.5 mm or more, and even more preferably 3.0 mm or more, and is preferably 6.0 mm or less, more preferably 5.0 mm or less, and even more preferably 4.0 mm or less. If the compression deformation amount is 2.0 mm or more, the core does not become excessively hard, and thus the shot feeling thereof becomes better. If the compression deformation amount is 6.0 mm or less, the core does not become excessively soft, and thus the resilience thereof becomes better.

In addition, when the golf ball according to the present invention is a three-piece golf ball or a multi-piece golf ball, the intermediate layer may use the same material as the cover material which will be described later, and example of the material thereof include an ionomer resin, a thermoplastic polyamide resin, a thermoplastic polyester resin, a thermoplastic polyurethane resin, and a thermoplastic polystyrene resin. The intermediate layer may further contain a weight adjusting agent such as barium sulfate and tungsten, an antioxidant, a pigment, or the like.

Next, the cover of the golf ball according to the present invention will be explained. Examples of the cover material for forming the cover of the golf ball according to the present invention include, but are not particularly limited to, various resins such as an ionomer resin, a polyester resin, a urethane resin such as a thermoplastic urethane resin and a two-component curing type urethane resin, and a polyamide resin; a thermoplastic polyamide elastomer having a trade name of "Pebax (registered trademark) (e.g. "Pebax 2533")" available from Arkema Inc.; a thermoplastic polyester elastomer having a trade name of "Hytrel (registered trademark) (e.g. "Hytrel 3548" and "Hytrel 4047")" available from Du Pont-Toray Co., Ltd.; a thermoplastic polyurethane elastomer having a trade name of "Elastollan (registered trademark) (e.g. "Elastollan XNY97A")" available from BASF Japan Ltd.; and a thermoplastic polystyrene elastomer having a trade name of "TEFABLOC (registered trademark)" available from Mitsubishi Chemical Corporation. These cover materials may be used solely, or two or more of these cover materials may be used in combination.

Specific examples of the ionomer resin include an ionomer resin obtained by neutralizing at least a part of carboxyl groups included in a copolymer composed of ethylene and an α,β-unsaturated carboxylic acid having 3 to 8 carbon atoms with a metal ion; an ionomer resin obtained by neutralizing at least a part of carboxyl groups included in a ternary copolymer composed of ethylene, an α,β-unsaturated carboxylic acid having 3 to 8 carbon atoms and an α,β1-unsaturated carboxylic acid ester with a metal ion; and a mixture thereof.

Examples of the neutralizing metal ion include a monovalent metal ion such as sodium ion, potassium ion and lithium ion; a divalent metal ion such as zinc ion, calcium ion, magnesium ion, copper ion and manganese ion; and a trivalent metal ion such as aluminum ion and neodymium ion. In particular, zinc ion is preferable because zinc ion has a great bonding force in a metal ion aggregate.

Specific examples of the ionomer resin in terms of trade names include "Himilan (registered trademark) (e.g. a binary ionomer resin such as Himilan 1555 (Na), Himilan 1557 (Zn), Himilan 1605 (Na), Himilan 1706 (Zn), Himilan 1707 (Na) and Himilan AM7311 (Mg), and a ternary ionomer resin such as Himilan 1856 (Na) and Himilan 1855 (Zn))" available from Mitsui Dow Polychemicals Co., Ltd.

Further, examples of the ionomer resin available from E.I. du Pont de Nemours and Company include "Surlyn (registered trademark) (e.g. a binary ionomer resin such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li) and Surlyn AD8546 (Li), and a ternary ionomer resin such as Surlyn 8120 (Na), Surlyn 8320 (Na), Surlyn 9320 (Zn) and Surlyn 6320 (Mg))".

Examples of the ionomer resin available from ExxonMobil Chemical Corporation include Iotek (registered trademark) (e.g. a binary ionomer resin such as Iotek 8000 (Na), Iotek 8030 (Na), Iotek 7010 (Zn) and Iotek 7030 (Zn), and a ternary ionomer resin such as Iotek 7510 (Zn) and Iotek 7520 (Zn))". It is noted that Na, Zn, K, Li, Mg or the like described in the parentheses after the trade name of the ionomer resin indicates a metal type of the neutralizing metal ion of the ionomer resin.

Examples of the urethane resin or polyurethane elastomer (hereinafter collectively referred to as "urethane resin") constituting the cover include a two-component curing type urethane resin obtained by curing an isocyanate group terminated urethane prepolymer with an aromatic polyamine, and a thermoplastic urethane resin. The polyisocyanate component constituting the urethane resin is not particularly limited, as long as it has at least two isocyanate groups, and the polyisocyanate component includes, for example, an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). The polyisocyanate is used solely, or as a mixture of at least two of them. Among them, from the viewpoint of weather resistance, the non-yellowing polyisocyanate (e.g. TMXDI, XDI, HDI, $H_6$XDI, IPDI, $H_{12}$MDI and NBDI) is preferably used.

In addition, the polyol component constituting the urethane resin is not particularly limited, as long as it has a plurality of hydroxyl groups, and the polyol component includes, for example, a low molecular weight polyol or a high molecular weight polyol. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. It is noted that the polyol may be used solely or as a mixture of at least two of them.

The aromatic polyamine is not particularly limited as long as it is a compound having at least two amino groups directly or indirectly bonding to an aromatic ring, and examples thereof include a compound having an amino group directly bonding to an aromatic ring, such as phenylene diamine, toluene diamine and diethyltoluene diamine; a compound having an amino group bonding to an aromatic ring via a sulfide bond, such as dimethylthiotoluene diamine; a compound having an amino group bonding to an aromatic ring via a lower alkyl group, such as xylylene diamine; and 4,4'-diaminodiphenylmethane and a derivate thereof.

In the present invention, the cover may contain a pigment component such as zinc oxide, titanium oxide and a blue pigment; a weight adjusting agent such as calcium carbonate and barium sulfate; a dispersant; an antioxidant; an ultraviolet absorber; a light stabilizer; a fluorescent material or fluorescent brightener; and the like, in addition to the above described resin component, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. This is because if the amount of the white pigment is 0.5 part by mass or more, it is possible to impart the opacity to the cover, and if the amount of the white pigment is more than 10 parts by mass, the durability of the obtained cover may deteriorate.

In the present invention, the thickness of the cover of the golf ball is preferably 0.3 mm or more, more preferably 0.5 mm or more, and even more preferably 1.0 mm or more, and is preferably 5.0 mm or less, more preferably 4.6 mm or less, and even more is preferably 2.5 mm or less. If the thickness of the cover is less than 0.3 mm, the cover is so thin that the durability may be lowered, and if the thickness of the cover is more than 5.0 mm, the shot feeling of the golf ball may be lowered.

The method for forming the constituent member of the golf ball from the rubber composition is not particularly limited. For example, the constituent member of the golf ball can be formed by molding the kneaded rubber composition in a mold. The molding condition is not particularly limited, but the molding is generally carried out at 130° C. to 200° C. under a pressure of 2.9 MPa to 11.8 MPa for 10 to 60 minutes. For example, it is preferable that the rubber composition is heated at 130° C. to 200° C. for 10 to 60 minutes, alternatively the rubber composition is heated at 130° C. to 150° C. for 20 to 40 minutes and then heated at 160° C. to 180° C. for 5 to 15 minutes.

In case of the one-piece golf ball, the golf ball body is formed from the above described rubber composition. In case of the multiple layered core, at least one layer selected from the group consisting of the center and the intermediate layer is formed from the above described rubber composition, and examples thereof include an embodiment in which only the center is formed from the above described rubber composition, and an embodiment in which both the center and the intermediate layer are formed from the above described rubber composition.

Examples of the method for forming the intermediate layer include a method of covering the center with the intermediate layer composition to mold the intermediate layer. Examples of the method for molding the intermediate layer include, but is not particularly limited to, a method of molding the intermediate layer composition into hemispherical half shells in advance, covering the center with two of the hemispherical half shells, and applying a pressure thereto at 130° C. to 170° C. for 1 to 5 min to carry out the molding, and a method of injection molding the intermediate layer composition directly onto the center to cover the center with the intermediate layer.

Examples of the method for molding the cover of the golf ball according to the present invention include a method which comprises molding the cover composition into a hollow-shell, covering the core with a plurality of the hollow-shells and subjecting the core with a plurality of the hollow shells to the compression molding (preferably a method which comprises molding the cover composition into a half hollow-shell, covering the core with two of the half hollow-shells, and subjecting the core with two of the half hollow-shells to the compression molding); and a method which comprises injection molding the cover composition directly onto the core.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 μm or more, more preferably 7 μm or more, and preferably has a thickness of 25 μm or less, more preferably 18 μm or less. If the thickness of the paint film is less than 5 μm, the paint film is easy to wear off due to the continued use of the golf ball, and if the thickness of the paint film exceeds 25 μm, the dimple effect is reduced and thus the flight performance of the golf ball may be lowered.

The golf ball according to the present invention preferably has a diameter in a range of from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball according to the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball according to the present invention has a diameter in a range of from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.2 mm or more, and even more preferably 2.4 mm or more, and is preferably 4.0 mm or less, more preferably 3.5 mm or less, and even more preferably 3.4 mm or less. If the compression deformation amount is 2.0 mm or more, the golf ball does not become excessively hard, and thus the shot feeling thereof becomes better. On the other hand, if the compression deformation amount is 4.0 mm or less, the resilience becomes higher.

The FIGURE is a partially cutaway cross-sectional view of a golf ball 1 according to one embodiment of the present invention. The golf ball 1 comprises a spherical core 2, and a cover 3 covering the spherical core 2. A plurality of dimples 31 are formed on the surface of the cover. Other portion than the dimples 31 on the surface of the golf ball 1 is a land 32. The golf ball 1 is provided with a paint layer and a mark layer outside the cover 3, but these layers are not depicted.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]

(1) Compression Deformation Amount (Mm)

The compression deformation amount of the core (shrinking amount of the core along the compression direction) when applying a load from an initial load of 98 N to a final load of 1275 N to the core, was measured.

(2) Coefficient of Restitution

A metal cylindrical object with a mass of 198.4 g was allowed to collide with each core at a speed of 40 m/sec, and speeds of the cylindrical object and the core before and after the collision were measured. Based on the speed and the mass of each object, the coefficient of restitution for each core was calculated. The measurement was conducted using twelve samples for each core, and the average value thereof was adopted as the coefficient of restitution of the core. It is noted that the coefficient of restitution of each core was shown as a difference from the coefficient of restitution of the core No. 5 (difference of coefficient of restitution=coefficient of restitution of each core—coefficient of restitution of core No. 5).

Preparation of Organic Sulfur Compound

Bis[4-(pentafluorosulfanyl)phenyl]disulfide

A saturated methanol solution was prepared by dissolving 4-(pentafluorosulfanyl)thiophenol (available from Aldrich Co. LLC.) in methanol. An iodine-potassium iodide aqueous solution (KI/I2 aq) was added dropwise in this saturated methanol solution. The precipitate was collected by suction filtration, vacuum dried, and recrystallized with ethanol to obtain bis[4-(pentafluorosulfanyl)phenyl]disulfide.

Bis[(4-trifluoromethyl)phenyl]disulfide

A saturated methanol solution was prepared by dissolving 4-trifluoroethyl thiophenol ((available from Tokyo Chemical Industry Co., Ltd.) in methanol. An iodine-potassium iodide aqueous solution (KI/I2 aq) was added dropwise in this saturated methanol solution. The precipitate was collected by suction filtration, vacuum dried, and recrystallized with ethanol to obtain bis[(4-trifluoromethyl)phenyl]disulfide.

Bis[3,5-bis(pentafluorosulfanyl)phenyl]disulfide

In a flask provided with a stir bar, a dropping funnel, and a thermometer, 3,5-bis(pentafluorosulfanyl)bromobenzene 20.00 g (48.89 mmol) available from UBE Industries, Ltd and diethyl ether 64.0 mL were added in a nitrogen atmosphere, and cooled in a bath using dry ice and acetone. Subsequently, a pentane solution of t-butyl lithium 51.0 mL (82.11 mmol) (Kanto Chemical Co., Inc. Concentration 1.61 mol/L) was added dropwise for 40 minutes, in an hour after starting the addition, sulfur 1.88 g (56.67 mmol) in a state of solid was added. While keeping the flask in a cooling bath, the reaction liquid was stirred for 13 hours until the temperature of the reaction liquid reaches a room temperature. In 13 hours after starting stirring, the reaction mixture was diluted with diethyl ether 400 mL, and the reaction was terminated by adding hydrochloric acid 84 mL (Concentration 1 mol/L). The organic phase was separated, the water phase was extracted with 400 mL of diethyl ether twice. The diethyl ether used for extraction was mixed in the organic phase, the organic phase wad dried with sodium sulfate, condensed in a vacuum to obtain a light brown and viscous liquid 17.80 g. The obtained liquid was purified with an open column (silica gel) to obtain bis[3,5-bis(pentafluorosulfanyl)phenyl]disulfide 3.55 g (yield 20%, purity 97.8%) in a solid state.

[Production of Spherical Core]

According to the formulations shown in Table 2, the rubber compositions were kneaded with a kneading roll, and heat pressed in upper and lower molds, each having a hemispherical cavity, at 170° C. for 20 min, to obtain spherical cores having a diameter of 39.8 mm. It is noted that the amount of the co-crosslinking agent was adjusted such that the obtained cores were at the same level in the compression deformation amount, and barium sulfate was appropriately added such that the obtained cores had a mass of 35.5 g.

TABLE 2

| | Core No. | 1 | 2 | 3 | 4 | 5 | 6 |
|---|---|---|---|---|---|---|---|
| Formulation (parts by mass) | Polybutadiene rubber | 100 | 100 | 100 | 100 | 100 | 100 |
| | ZN-DA90S | 27 | 27 | 27 | 29 | 30 | 25 |
| | Zinc oxide | 5 | 5 | 5 | 5 | 5 | 5 |
| | 4-(Pentafluorosulfanyl)thiophenol | 0.24 | — | — | — | — | — |
| | Bis[4-(pentafluorosulfanyl)phenyl]disulfide | — | 0.24 | — | — | — | — |
| | Bis[3,5-bis(pentafluorosulfanyl)phenyl]disulfide | — | — | 0.36 | 0.72 | — | — |
| | Bis[4-(trifluoromethyl)phenyl]disulfide | — | — | — | — | — | 0.18 |
| | Barium sulfate | * | * | * | * | * | * |
| | Dicumyl peroxide | 0.8 | 0.8 | 0.8 | 0.8 | 0.8 | 0.8 |
| Properties | Compression deformation amount (mm) | 4.0 | 3.9 | 4.0 | 4.1 | 3.9 | 4.2 |
| | Coefficient of restitution (difference from No. 5) | 0.008 | 0.011 | 0.013 | 0.015 | 0.000 | 0.002 |

* Appropriate amount

The materials used in Table 2 are shown below.

Polybutadiene rubber: "BR730" (high-cis polybutadiene rubber (amount of cis-1,4 bond=96 mass %, amount of 1,2-vinyl bond=1.3 mass %, Moony viscosity ($ML_{1+4}$ (100° C.)=55, molecular weight distribution (Mw/Mn)=3)) available from JSR Corporation ZN-DA90S: zinc acrylate (containing zinc stearate in an amount of 10 mass %) available from Nisshoku Techno Fine Chemical Co., Ltd.

Zinc oxide: "Ginrei R" available from Toho Zinc Co., Ltd.

Barium sulfate: "Barium Sulfate BD" available from Sakai Chemical Industry Co., Ltd.

4-(Pentafluorosulfanyl)thiophenol: available from Aldrich Co. LLC.

Dicumyl peroxide: "Percumyl (registered trademark) D" available from NOF Corporation The cores No. 1 to 4 are formed from a rubber composition containing a thiophenol having a halogenated sulfanyl group or a diphenyl disulfide having a halogenated sulfanyl group as (d) the organic sulfur compound. These cores No. 1 to 4 have more excellent resilience performance than the core No. 6 which is formed from a rubber composition containing bis[4-(trifluoromethyl)phenyl]disulfide as the organic sulfur compound. If these cores No. 1 to 4 are used, a golf ball having excellent resilience performance is obtained.

This application is based on Japanese patent applications No. 2018-203923 filed on Oct. 30, 2018, and No. 2019-192438 filed on Oct. 23, 2019 the content of which is hereby incorporated by reference.

The invention claimed is:

1. A golf ball comprising a constituent member, wherein at least a part of the constituent member is formed from a rubber composition containing (a) a base rubber, (b) a co-crosslinking agent, (c) a crosslinking initiator, and (d) an organic sulfur compound, wherein (d) the organic sulfur compound contains at least one member selected from the group consisting of a thiophenol having a halogenated sulfanyl group, a metal salt of a thiophenol having a halogenated sulfanyl group, and a diphenyl disulfide having a halogenated sulfanyl group.

2. The golf ball according to claim 1, wherein (d) the organic sulfur compound has a structure represented by a formula (1):

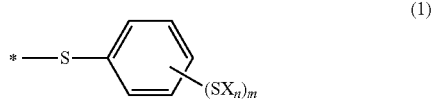

(1)

wherein in the formula (1), X represents a halogen atom, n represents an integer of 1 to 5, m represents an integer of 1 to 5, a plurality of X may be identical to or different from each other when n or m is 2 or more, and * represents a bonding position.

3. The golf ball according to claim 2, wherein in the structure represented by the formula (1), a structure represented by a formula (11) has a solubility parameter value in a range of from 15.5 $(J/cm^3)^{1/2}$ to 21.0 $(J/cm^3)^{1/2}$:

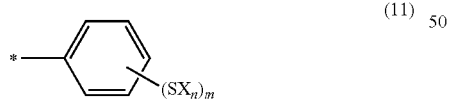

(11)

wherein in the formula (11), X, n and m have the same meaning as those in the formula (1), and * represents a bonding position.

4. The golf ball according to claim 1, wherein an amount of (d) the organic sulfur compound ranges from 0.05 part by mass to 5 parts by mass with respect to 100 parts by mass of (a) the base rubber.

5. The golf ball according to claim 1, wherein (d) the organic sulfur compound contains at least one member selected from the group consisting of a compound represented by a formula (2), a compound represented by a formula (3), and a compound represented by a formula (4):

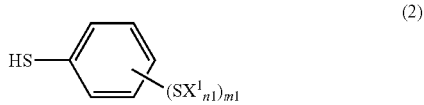

(2)

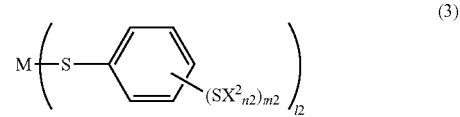

(3)

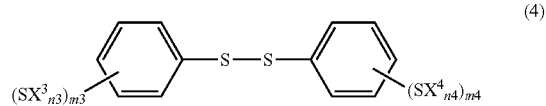

(4)

wherein in the formula (2), $X^1$ represents a halogen atom, n1 represents an integer of 1 to 5, m1 represents an integer of 1 to 5, and a plurality of $X^1$ may be identical to or different from each other when n1 or m1 is 2 or more;

in the formula (3), $X^2$ represents a halogen atom, M represents a metal atom, n2 represents an integer of 1 to 5, m2 represents an integer of 1 to 5, l2 represents 1 or 2, and a plurality of $X^2$ may be identical to or different from each other when n2 or m2 is 2 or more; and in the formula (4), $X^3$ and $X^4$ represent a halogen atom, n3 represents an integer of 1 to 5, m3 represents an integer of 1 to 5, a plurality of $X^3$ may be identical to or different from each other when n3 or m3 is 2 or more, n4 represents an integer of 1 to 5, m4 represents an integer of 1 to 5, and a plurality of $X^4$ may be identical to or different from each other when n4 or m4 is 2 or more.

6. The golf ball according to claim 1, wherein (d) the organic sulfur compound contains at least one member selected from the group consisting of a compound represented by a formula (5), a compound represented by a formula (6), and a compound represented by a formula (7):

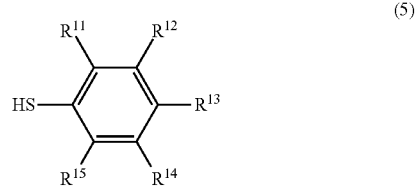

(5)

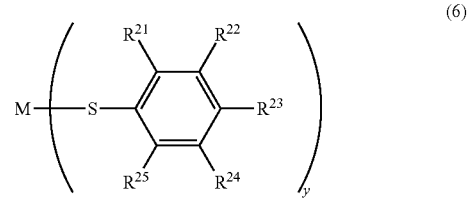

(6)

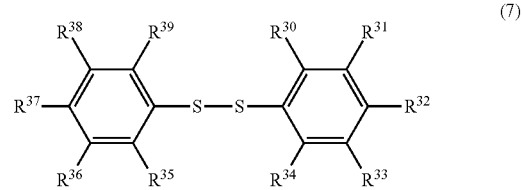

(7)

wherein in the formulae (5) to (7), $R^{11}$ to $R^{15}$, $R^{21}$ to $R^{25}$, and $R^{30}$ to $R^{39}$ are identical to or different from each other and represent a hydrogen atom, a fluorosulfanyl group (—SF), a difluorosulfanyl group (—SF$_2$), a trifluorosulfanyl group (—SF$_3$), a tetrafluorosulfanyl group (—SF$_4$), a pentafluorosulfanyl group (—SF$_5$) or a tetrafluorochlorosulfanyl group (—SF$_4$Cl), at least one group among R$^{11}$ to R$^{15}$ is a substituent group other than a hydrogen atom, at least one group among R$^{21}$ to R$^{25}$ is a substituent group other than a hydrogen atom, at least one group among R$^{30}$ to R$^{39}$ is a substituent group other than a hydrogen atom, M represents a metal atom, and y represents 1 or 2.

7. The golf ball according to claim 1, wherein (d) the organic sulfur compound contains at least one member selected from the group consisting of 4-(pentafluorosulfanyl)thiophenol, 4-(trifluorosulfanyl)thiophenol, 4-(tetrafluorochlorosulfanyl)thiophenol, 2,4,6-tri(pentafluorosulfanyl)thiophenol, 2,3,4,5,6-penta(pentafluorosulfanyl)thiophenol, 3,5-di(pentafluorosulfanyl)thiophenol, bis[3,5-bis(pentafluorosulfanyl)phenyl]disulfide and bis[4-(pentafluorosulfanyl)phenyl]disulfide.

8. The golf ball according to claim 1, wherein (d) the organic sulfur compound consists of at least one member selected from the group consisting of the thiophenol having the halogenated sulfanyl group, the metal salt of the thiophenol having the halogenated sulfanyl group, and the diphenyl disulfide having the halogenated sulfanyl group.

9. The golf ball according to claim 1, wherein (a) the base rubber contains a high-cis polybutadiene.

10. The golf ball according to claim 9, wherein the high-cis polybutadiene has a molecular weight distribution in a range of from 2.0 to 6.0.

11. The golf ball according to claim 9, wherein the high-cis polybutadiene has a Mooney viscosity (ML$_{1+4}$ (100° C.)) in a range of from 30 to 140.

12. The golf ball according to claim 1, wherein a main component of (a) the base rubber has a solubility parameter value in a range of from 14.70 (J/cm$^3$)$^{1/2}$ to 18.60 (J/cm$^3$)$^{1/2}$, and the main component of (a) the base rubber is the rubber component in the largest amount in (a) the base rubber.

13. The golf ball according to claim 1, wherein a solubility parameter value difference (absolute value) between a main component of (d) the organic sulfur compound and a main component of (a) the base rubber is 6.30 (J/cm$^3$)$^{1/2}$ or less, and the main component of (a) the base rubber is the rubber component in the largest amount in (a) the base rubber.

14. The golf ball according to claim 1, wherein the golf ball is a one-piece golf ball, wherein the golf ball body is formed from the rubber composition.

15. The golf ball according to claim 1, wherein the golf ball comprises a single layered spherical core and at least one cover covering the spherical core, wherein the spherical core is formed from the rubber composition.

* * * * *